US012782719B2

(12) United States Patent
Pan et al.

(10) Patent No.: US 12,782,719 B2
(45) Date of Patent: Nov. 3, 2026

(54) MEASUREMENT METHOD AND DEVICE OF NEAR-EYE DISPLAY

(71) Applicant: HANGZHOU EVERFINE PHOTO-E-INFO CO., LTD., Hangzhou (CN)

(72) Inventors: Jiangen Pan, Hangzhou (CN); Li Song, Hangzhou (CN); Qian Li, Dalian (CN)

(73) Assignee: HANGZHOU EVERFINE PHOTO-E-INFO CO., LTD., Hangzhou (CN)

( * ) Notice: Subject to any disclaimer, the term of this patent is extended or adjusted under 35 U.S.C. 154(b) by 0 days.

(21) Appl. No.: 18/648,424

(22) Filed: Apr. 28, 2024

(65) Prior Publication Data

US 2024/0310626 A1 Sep. 19, 2024

Related U.S. Application Data

(63) Continuation of application No. PCT/CN2022/140316, filed on Dec. 20, 2022.

(30) Foreign Application Priority Data

Mar. 4, 2022 (CN) ......................... 202210205733.3
Jun. 25, 2023 (CN) ......................... 202321602643.4

(51) Int. Cl.
*G02B 27/00* (2006.01)
*G02B 27/01* (2006.01)
*G06V 40/18* (2022.01)

(52) U.S. Cl.
CPC ..... *G02B 27/0093* (2013.01); *G02B 27/0172* (2013.01); *G06V 40/193* (2022.01); *G02B 2027/0138* (2013.01); *G02B 2027/014* (2013.01)

(58) Field of Classification Search
CPC ............ G02B 27/0093; G02B 27/0172; G02B 2027/0138; G02B 2027/014; G06V 40/193
See application file for complete search history.

(56) References Cited

U.S. PATENT DOCUMENTS 8,098,263 B2 * 1/2012 Noro ........................ G06F 3/014 345/619
11,397,465 B1 * 7/2022 Mattila .............. G02B 27/0093
(Continued)

FOREIGN PATENT DOCUMENTS

CN 111678674 A * 9/2020
CN 112816183 A * 5/2021

*Primary Examiner* — Amy Onyekaba
(74) *Attorney, Agent, or Firm* — PROI Intellectual Property US

(57) ABSTRACT

The present invention provides measurement methods and devices for near-eye displays. One of the measurement methods and devices of the present invention uses a surface array photoelectric sensor without an imaging lens and a transmission mechanism to obtain an exit pupil parameter of the near eye display to be measured, and uses a surface array photoelectric sensor without an imaging lens, a transmission mechanism and an imaging mechanism to obtain an optical axis position of the near eye display to be measured. Another measurement method and device of the present invention controls the transmission mechanism by means of a programmed control system, so that the near-eye display to be measured and the optical receiving screen undergo relative motion, and the pupil exit parameter of the near-eye display to be measured is obtained by observing and analyzing the light spot on the optical receiving screen.

10 Claims, 7 Drawing Sheets

(56) References Cited

U.S. PATENT DOCUMENTS

| | | | | |
|---|---|---|---|---|
| 2017/0176751 | A1* | 6/2017 | Ouderkirk | G02C 7/086 |
| 2017/0315356 | A1* | 11/2017 | Tervo | G02B 27/0176 |
| 2018/0314035 | A1* | 11/2018 | Nakahara | G02B 1/041 |
| 2021/0080730 | A1* | 3/2021 | Morrison | G02B 27/0179 |
| 2021/0243361 | A1* | 8/2021 | Ebata | H04N 23/634 |
| 2022/0353426 | A1* | 11/2022 | Horie | H04N 23/634 |
| 2023/0092593 | A1* | 3/2023 | Nakamichi | G06F 3/013<br>382/103 |
| 2023/0236666 | A1* | 7/2023 | Takagi | G02B 27/0093<br>345/156 |
| 2024/0203308 | A1* | 6/2024 | Jiang | G01M 11/0207 |
| 2024/0310626 | A1* | 9/2024 | Pan | G02B 27/0093 |

* cited by examiner

MEASUREMENT METHOD AND DEVICE OF NEAR-EYE DISPLAY

TECHNICAL FIELD

The present invention relates to the field of optical characteristic testing of near-eye display, and in particular, to a measurement method and apparatus of a near-eye display.

BACKGROUND

A near-eye display, also referred to as a head-mounted display or a virtual display, is mainly divided into virtual reality (VR) and augmented reality (AR). The principle of the near-eye display is shown in FIG. 2. In the figure, 1 denotes a near-eye display to be measured, 2 denotes an object plane of the near-eye display to be measured, 3 denotes an optical axis of the near-eye display to be measured, 4 denotes an exit pupil, 8 denotes an image-space picture (an image plane, i.e., an output picture) output by the near-eye display to be measured, 9 denotes an eye box, and 10 denotes an eye point, wherein the eye point 10 is located at the center of the exit pupil 4, and the optical axis 3 passing through the eye point 10 and is vertical to the plane where the exit pupil 4 is located. The basic measurement geometry of the display optical characteristics of the near-eye display is that the optical axis of a measurement device needs to coincide with the optical axis 4 of the near-eye display to be measured, and the entrance pupil of a lens of the measurement device is placed at the eye point 10 of the near-eye display to be measured. The determination of the exit pupil, the eye point and the optical axis of the near-eye display to be measured is crucial to the measurement of the optical performance of the near-eye display.

Corresponding to FIG. 2, a spatial region in which a complete image can be observed in the image space of the near-eye display is called the eye box of the near-eye display, a region as shown by 9 in FIG. 2, and the method for measuring the exit pupil 4, the eye point 10 and the optical axis 3 of the near-eye display is mainly determined by means of measuring the eye box 9. In general, the exit pupil 4 is regarded as the maximum cross section of the eye box 9, and its central point is directly considered as the eye point 10, and the optical axis 3 is obtained by means of the eye point 10 and the exit pupil 4. Therefore, the key is to find out the region of the eye box 9. In an existing measurement method of eye box 9, an aiming point type luminance meter with an optical lens is used, images displayed by the near-eye display are measured at different positions by means of the luminance meter, and the eye box is judged according to a luminance change in the boundary. During the measurement, the entrance pupil of the aiming point type luminance meter is placed in the center at first, and then the aiming point type luminance meter is translated, and the angle of the luminance meter needs to be adjusted while moving, so as to ensure that the measurement point does not move, and record the luminance value. When the luminance value is lower than 50% of that of an initial position, it is considered as boundary position of the eye box 9 in the moving direction. The above steps are repeated to obtain the boundaries of the eye box 9 in other directions, and the exit pupil 4, the eye point 10 and the optical axis 3 of the near-eye display are further obtained.

On the other hand, the existing optical axis alignment method is mainly to align the cross center of the imaging system used for measurement with the cross center of the output image of the near-eye display to be measured, that is, it is considered that the optical axis of the measurement device is aligned with the optical axis 3 of the near-eye display to be measured. In fact, when the alignment angle is different, the cross center can still be aligned, therefore the method has a relatively large error.

The operations of the existing method for obtaining the exit pupil 4, the eye point 10 and the optical axis 3 of the near-eye display 1 by means of measuring the region of the eye box 9 are extremely complex, in addition, the measurement of the eye box 9 itself is affected by the moving precision, stepping, alignment precision, and the like, therefore there is a relatively large error, and moreover, the measurement efficiency is low.

SUMMARY

In view of the deficiencies of the prior art, the present invention provides a measurement method and apparatus of a near-eye display, which aim to solve the problems in the prior art of a relatively large measurement error of the exit pupil, eye point and optical axis of a near-eye display, complex and expensive devices, complex operations and low efficiency.

In order to achieve the above objective, the technical solution utilized in the present invention is as follows:

The present invention provides a measurement method of a near-eye display, wherein a plane-array photoelectric sensor having no imaging lens or an optical receiving screen, and a transmission mechanism is used to obtain an exit pupil parameter of a near-eye display to be measured. The method specifically includes: the near-eye display to be measured outputs a picture, and the plane-array photoelectric sensor or a optical receiving screen is placed in a human eye viewing region of the near-eye display to be measured, this region is also referred to as an eye box of the near-eye display, and the plane-array photoelectric sensor or optical receiving screen directly receives an optical output signal from the near-eye display to be measured and obtains an illumination image. According to the optical imaging principle of the near-eye display, an exit pupil is a common exit of imaging light beams of various points of the near-eye display, that is, the emergent light of an output image of the near-eye display passes through the exit, and each point on the exit contains light information of various points of the whole output image, therefore the illumination distribution is relatively uniform and has an obvious boundary. If the plane-array photoelectric sensor or optical receiving screen is located on the exit pupil of the near-eye display and the area of sensitive region can completely cover the whole exit pupil, the plane-array photoelectric sensor or the optical receiving screen can receive an exit pupil image of which the illumination distribution is relatively uniform with clear boundaries. The area enclosed by the clearest image boundaries is the minimum compared with the areas of light spot images received at other positions. If the plane-array photoelectric sensor or optical receiving screen deviates from the exit pupil, the illumination image obtained by the plane-array photoelectric sensor becomes larger and the boundary is blurred. Therefore, the relative position of the plane-array photoelectric sensor or optical receiving screen and the near-eye display to be measured is controlled by the transmission mechanism, so that illumination images are obtained at different spatial positions, the illumination images at different spatial positions are analyzed by using an image boundary recognition algorithm, when the obtained image has the clearest boundary and the area of the image is the minimum, the plane-array photoelectric sensor or optical receiving screen is regarded as located on plane of the exit pupil of the near-eye display to be measured. As shown in FIG. 1, 1 denotes the near-eye display to be measured, 2 denotes an object plane of the near-eye display to be measured, 3 denotes an optical axis of the near-eye display to be measured, 5 denotes an illumination image of light which is received, 6 denotes the plane-array photoelectric sensor or optical receiving screen, and 7 denotes the sensitive region of the plane-array photoelectric sensor or optical receiving screen.

It should be noted that, in the above technical solution, the exit pupil parameter contains: spatial position information of the exit pupil, an eye point and the optical axis, and two-dimensional size information of an exit pupil boundary. In order to avoid ambiguity, the exit pupil, the eye point and the optical axis are further illustrated in the present technical solution as follows: the exit pupil is an optical image of an entrance pupil of an optical system of the near-eye display to be measured, and is a common exit of emergent light beams after various points on an object plane (i.e., an original emission surface of a display image) are imaged by the optical system of the near-eye display, and the position and size of the exit pupil of the near-eye display are important parameters of the near-eye display; the eye point is located in a plane where the exit pupil is located and is located at the center of the exit pupil, and is also a foot point of the optical axis and the exit pupil; and the optical axis is a straight line which passes through the eye point and is vertical to the plane where the exit pupil is located.

For ease of expression, all pictures output by the near-eye display below refer to image-space pictures which are output by the object plane of the near-eye display and are imaged by the optical system of the near-eye display.

Further, in the above technical solution, on the basis that the plane of the plane-array photoelectric sensor or optical receiving screen is located on the plane of exit pupil of the near-eye display to be measured, the center of the illumination image captured is obtained by using an image center recognition algorithm, and is regarded as the eye point of the near-eye display to be measured.

Further, in the above technical solution, the optical axis of the near-eye display to be measured is obtained by the following method: drawing a vertical line in a manner of passing through the central position of the exit pupil, wherein a straight line where the vertical line is located is the optical axis of the near-eye display to be measured.

Further, in the above technical solution, the image boundary recognition algorithm includes, but is not limited to, a boundary sharpness recognition algorithm and/or a boundary contrast recognition algorithm. When the image boundary sharpness and/or the contrast reach an extreme value, the clearest boundary is obtained. Further, the algorithm is used for judging the boundary clarity of the illumination distribution image obtained in each direction and position.

Further, in the above technical solution, the image center recognition algorithm includes, but is not limited to, a grayscale gravity center method or a geometric method. The grayscale gravity center method is to calculate the coordinates of a grayscale weight center according to the grayscale distribution of the illumination image obtained by the plane-array photoelectric sensor. The geometric method is to acquire a graph which is enclosed by the boundary of the illumination image obtained by the plane-array photoelectric sensor, and to calculate a geometric center of the graph.

Further, in the above technical solution, when the size of a photosensitive surface of the plane-array photoelectric sensor is less than the size of the exit pupil of the near-eye display to be measured, the plane-array photoelectric sensor cannot acquire a complete illumination pattern, the illumination images received by the plane-array photoelectric sensor at different positions can be acquired step by step, and are proceeded by using the image boundary recognition algorithm, and when the illumination image has the clearest boundary or a relatively minimum area, the plane-array photoelectric sensor is located on the exit pupil of the near-eye display to be measured. By means of the transmission mechanism, the plane-array photoelectric sensor and the near-eye display to be measured translate relative to each other, a complete exit pupil is obtained by splicing, and further, the eye point and the optical axis of the near-eye display to be measured can be obtained according to the central position of the exit pupil.

Further, in the above technical solution, the plane-array photoelectric sensor or the near-eye display to be measured is controlled by the transmission mechanism, so that the plane-array photoelectric sensor and the near-eye display to be measured move relative to each other, the plane-array photoelectric sensor obtains illumination images at different spatial positions, the illumination images at different spatial positions are analyzed by using the image boundary recognition algorithm, the area of the illumination image obtained by the plane-array photoelectric sensor is the minimum compared with those at other positions. Further, in the method, the spatial position of the exit pupil of the near-eye display to be measured and the boundary clarity of the illumination distribution image obtained by the plane-array photoelectric sensor are used as criteria, and the obtained spatial position of the exit pupil of the near-eye display can be mutually verified.

Further, in the above technical solution, the relative motion between the plane-array photoelectric sensor and the near-eye display to be measured includes translation in three directions, that is, upper-lower, left-right and front-rear directions, and rotation along two or more mutually vertical rotating axes, or a multi-degree-of-freedom composite motion.

In some optional embodiments, the picture output by the near-eye display to be measured includes, but is not limited to, a full-white picture or a black-bottom and white-frame picture. According to the optical imaging principle of the near-eye display, the type of the output picture of the near-eye display to be measured does not affect the illumination uniformity and boundary characteristics of the exit pupil.

Further, in the above technical solution, the process of controlling the plane-array photoelectric sensor and the near-eye display to be measured by using the transmission mechanism, so that the plane-array photoelectric sensor and the near-eye display to be measured move relative to each other specifically includes: processing and analyzing the illumination image, so as to obtain corresponding position and posture (referred to as "pose" for short) adjustment information, and adjusting the relative position between the plane-array photoelectric sensor and the near-eye display to be measured by means of the transmission mechanism.

The present invention further discloses a measurement method of a near-eye display, wherein a plane-array photoelectric sensor having no imaging lens, a transmission mechanism and an imaging device are used to obtain an optical axis of a near-eye display to be measured. The method specifically includes:

S1, the near-eye display to be measured displaying a first detection picture carrying an image center mark or not; the plane-array photoelectric sensor being placed in a human eye viewing region of the near-eye display to be measured, and directly receiving an optical output signal from the near-eye display to be measured and obtaining an illumination image;

S2, obtaining a central position of the illumination image by means of an image center recognition algorithm, and controlling the relative displacement of the imaging device and the near-eye display to be measured by means of the transmission mechanism, so that the center of an entrance pupil of the imaging device is placed at the central point position of an illumination image obtained by the foregoing plane-array photoelectric sensor;

S3, the near-eye display to be measured displaying a second detection picture carrying an image center mark, focusing the imaging device on the second detection picture, and controlling the displacement of the imaging device and the near-eye display to be measured by means of the transmission mechanism, so that the center of a receiving surface of the imaging device coincides with the center of the acquired second detection picture, and recording the position information of the imaging device and the optical axis thereof at this time;

S4, the near-eye display to be measured displaying the first detection picture, controlling the relative displacement of the plane-array photoelectric sensor and the near-eye display to be measured by means of the transmission mechanism, so that the pose of the plane-array photoelectric sensor is vertical to the optical axis of the imaging device in step S3, and then controlling the plane-array photoelectric sensor to be adjusted front and back in the optical axis direction, until an illumination image with the clearest boundary is obtained; and S5, repeating steps S2 to S4 until the boundary clarity of the illumination distribution image obtained in step S4 reaches a set range, then the optical axis position being the optical axis position of the near-eye display to be measured, a region where the boundary-clear illumination image obtained by the plane-array photoelectric sensor is located being the exit pupil of the near-eye display, and the center of the illumination distribution image being an eye point.

It should be noted that, in the above technical solution, when the plane-array photoelectric sensor obtains the illumination image with the clearest boundary according to the near-eye display imaging principle, the area enclosed by the boundary of the illumination image is the minimum compared with the areas of light spot received when the plane-array photoelectric sensor is located at other positions. Therefore, for step S4, the boundary clarity of the illumination distribution image can be replaced with the size of the area of the illumination image to serve as a criterion. The results of exit pupil parameters obtained by the two criteria can be mutually verified.

According to the optical imaging principle of the near-eye display, the optical axis of the near-eye display to be measured is vertical to the exit pupil and passing through the eye point, and the optical axis passes through the center of each illumination region parallel to the exit pupil in the eye box. The illumination image obtained by the plane-array photoelectric sensor can be analyzed using the image center recognition algorithm, so as to obtain the center of the illumination image, then the center of the entrance pupil of the imaging device is placed at the central position of the illumination image obtained by the plane-array photoelectric sensor, the near-eye display to be measured is controlled to output the second detection picture, the relative pose between the imaging device and the near-eye display to be measured is adjusted by using the transmission mechanism with the entrance pupil as a rotation center, when the center of the imaging device coincides with the center of the picture of the near-eye display to be measured, and the optical axis position of the imaging apparatus is recorded. At this time, the optical axis of the imaging device substantially coincides with the optical axis of the near-eye display. In order to obtain the optical axis of the near-eye display to be measured more accurately, verification and adjustment are needed, that is, the plane-array photoelectric sensor is placed vertical to the optical axis position of the foregoing imaging device, the center of the illumination distribution image is obtained again, the relative pose between the imaging device and the near-eye display to be measured is adjusted according to the center of the illumination image and the center of the image of the near-eye display to be measured, and the optical axis position of the imaging device is obtained again. The relative pose among the plane-array photoelectric sensor, the near-eye display and the imaging device is adjusted back and forth by means of the transmission mechanism, so as to realize multiple cyclic approximation, until the boundary clarity of the illumination distribution image obtained by the plane-array photoelectric sensor reaches a set tolerance, that is, when all boundaries of the obtained illumination image are the clearest, and the optical axis of the foregoing imaging device is the optical axis of the near-eye display to be measured, the region where the boundary-clear illumination image obtained by the plane-array photoelectric sensor is the exit pupil of the near-eye display, and the center of the illumination image is the eye point.

Further, in the above technical solution, the step S2 of controlling the relative displacement of the imaging device and the near-eye display to be measured by means of the transmission mechanism, has a plurality of implementation modes. For example, the near-eye display remains stationary, and the imaging device is controlled by the transmission mechanism, so as to adjust the poses of the imaging device.

Further, in the above technical solution, the image center recognition algorithm includes, but is not limited to, a grayscale gravity center method or a geometric method. The grayscale gravity center method is to calculate the coordinates of a grayscale weight center according to the grayscale distribution of the image. The geometric method is to recognize and acquire the centers of four sides of the illumination image, and the coordinates of an intersection point of connecting lines of the centers of two opposite sides are the coordinates of the center of the image.

Further, in the step S3, the transmission mechanism controls the imaging device or the near-eye display to be measured, so that the imaging device and the near-eye display to be measured move relative to each other, and generally rotate relative to each other, and the rotation center is located at the center of an entrance pupil position of a lens of the imaging device.

In some optional embodiments, the first detection picture output by the near-eye display to be measured includes, but is not limited to, a full-white board picture or a black-bottom and white-frame picture, and the picture can carry a center mark or not. The second detection image output by the near-eye display to be measured is an image carrying a center mark, including, but not limited to a full-center crosshair picture.

In some optional embodiments, the first detection picture and the second detection picture can be the same.

The present invention further discloses a measurement apparatus of a near-eye display, including a near-eye display to be measured, a sample stage for clamping the near-eye display to be measured, an plane-array photoelectric sensor, a first transmission mechanism and a programmed control system, wherein the plane-array photoelectric sensor is placed facing an output direction of the near-eye display to be measured, the plane-array photoelectric sensor or the sample stage is connected with the first transmission mechanism, and the first transmission mechanism is controlled by the programmed control system, so that the near-eye display to be measured and the plane-array photoelectric sensor move relative to each other; and the programmed control system is electrically connected with the first transmission mechanism and the plane-array photoelectric sensor, respectively. The relative motion between the plane-array photoelectric sensor and the near-eye display to be measured includes translation in three directions, that is, upper-lower, left-right and front-rear directions, and rotation along two or more mutually vertical rotating axes, or a multi-degree-of-freedom composite motion.

In some optional embodiments, the plane-array photoelectric sensor includes, but is not limited to, a CMOS and a CCD, and the plane-array photoelectric sensor has a corresponding data acquisition and transmission circuit. It should be noted that, it is used as an example herein only, and those skilled in the art can make adjustments according to common general knowledge.

In some optional embodiments, the first transmission mechanism includes a rotating mechanism and/or a translation mechanism.

In some optional embodiments, the first transmission mechanism is a robotic apparatus having four or more rotating axes.

Further, in the above technical solution, the measurement apparatus further includes a second transmission mechanism, the second transmission mechanism is connected with the sample stage, and the second transmission mechanism drives the sample stage to move; and the second transmission mechanism includes a rotating mechanism and a translation mechanism. The present invention further discloses another measurement apparatus of a near-eye display, including a sample stage for clamping the near-eye display to be measured, an plane-array photoelectric sensor, an imaging apparatus, a first transmission mechanism and a programmed control system, wherein the plane-array photoelectric sensor and the imaging device are respectively placed facing an output direction of the near-eye display to be measured, the plane-array photoelectric sensor and the imaging device are respectively connected with the first transmission mechanism, and the first transmission mechanism is controlled by the programmed control system, so as to adjust the poses of the plane-array photoelectric sensor and the imaging device. The programmed control system is electrically connected with the first transmission mechanism, the plane-array photoelectric sensor and the imaging device, respectively.

The various measurement methods and apparatus of the near-eye display have the following beneficial effects: the implementation steps of the measurement solution are simple, thereby greatly simplifying the measurement steps of the optical axis and the eye point of the near-eye display, improving the measurement efficiency, and reducing the measurement cost. In addition, in the other measurement method of the near-eye display provided in the present invention, a used measurement device is realized by the mutual cooperation of the plane-array photoelectric sensor and the imaging device, thereby greatly improving the measurement precision and the measurement efficiency, and reducing the measurement cost. In addition, the present invention further provides another near-eye display measurement apparatus, including a sample stage for clamping a near-eye display to be measured, an optical receiving screen, a transmission mechanism and a programmed control system. The optical receiving screen is arranged in a human eye viewing region of the near-eye display to be measured. The near-eye display to be measured outputs a picture, and a light beam of the near-eye display to be measured is directly incident onto the optical receiving screen and forms a illumination image. The transmission mechanism is connected with the sample stage and/or the optical receiving screen and is electrically connected with the programmed control system. The transmission mechanism is controlled by the programmed control system, so that the near-eye display to be measured and the optical receiving screen move relative to each other, and the exit pupil parameters of the near-eye display to be measured are obtained by observing and analyzing the illumination image on the optical receiving screen.

According to the optical imaging principle of the near-eye display for display, an exit pupil is a common exit of imaging light beams of various points of the near-eye display, the emergent light of an output image of the near-eye display passes through the exit, that is, each point on the exit contains light information of various points of the whole output image, and the illumination distribution thereof is relatively uniform and has obvious boundaries. If the optical receiving screen is located on the exit pupil of the near-eye display and the size of a light receiving surface of the optical receiving screen is greater than the size of the exit pupil of the near-eye display to be measured, an exit pupil light spot with uniform illumination distribution and clear boundaries can be formed on the optical receiving screen, and at this time, the area of this relatively clearest light spot is the minimum. If the optical receiving screen deviates from the exit pupil, the light spot (illumination image) obtained by the optical receiving screen becomes larger and the boundary is blurred. The transmission mechanism is controlled by the programmed control system, so that the optical receiving screen and the near-eye display to be measured move relative to each other, the optical receiving screen obtains light spot at different spatial positions, and the exit pupil parameter of the near-eye display to be measured is obtained by means of direct observation or combining an imaging measurement system with an image recognition algorithm. As shown in FIG. 9~11, the optical receiving screen is placed in the human eye viewing region 19 of the near-eye display to be measured, and the optical receiving screen directly receives a light beam from the near-eye display to be measured and forms a light spot image on the optical receiving screen.

As a technical solution, the optical receiving screen can be a diffuse transmission type screen or a diffuse reflection type screen, including, but not limited to, a diffuse transmission thin film and an anti-reflection film. The optical receiving screen should not affect the shape of the light spot, so as to obtain complete light information of the near-eye display to be measured.

When the transmission mechanism enables the optical receiving screen and the near-eye display to be measured to move relative to each other, the boundary of the illumination image can be gradually analyzed by using a tomography method, when the illumination image has the clearest boundary, it is judged that the optical receiving screen is located on a plane where the exit pupil of the near-eye display to be measured is located, and the illumination spot on the optical receiving screen is the exit pupil of the near-eye display to be measured; the central position of the exit pupil is the eye point of the near-eye display to be measured, and a vertical line of an exit pupil plane is drawn in a manner of passing through the central position of the exit pupil plane, so as to obtain the optical axis of the near-eye display to be measured. The exit pupil parameter contains: spatial position information of the exit pupil, the eye point and the optical axis, and two-dimensional size information of an exit pupil boundary. In order to avoid ambiguity, the exit pupil, the eye point and the optical axis are further illustrated in the present technical solution as follows: the exit pupil is an optical image of an entrance pupil of an optical system of the near-eye display to be measured, and is a common exit of emergent light beams from the various points on an object plane (i.e., an original emission surface of a display image), and the position and size of the exit pupil of the near-eye display are important parameters of the near-eye display; the eye point is located at the center of the exit pupil, and is also a foot point of the optical axis and the exit pupil; and the optical axis is a straight line which passes through the eye point and is vertical to the plane where the exit pupil is located. The boundary clarity of the illumination image can also be replaced with the size of the area of the illumination image to serve as a criterion, that is, the optical receiving screen and the near-eye display to be measurement are caused to move relative to each other by means of the transmission mechanism, the optical receiving screen obtains illumination images at different spatial positions, until the area of the image is the minimum compared with those at other positions, at this time, a plane position where the optical receiving screen is located is the plane of the exit pupil of the near-eye display to be measured, and at this time, an illumination region obtained by the optical receiving screen is the exit pupil of the near-eye display to be measured. The results of exit pupil parameters obtained by the two criteria can be mutually verified.

Further, the process in which the transmission mechanism is controlled by the programmed control system, so that the near-eye display to be measured and the optical receiving screen move relative to each other specifically includes: obtaining a corresponding pose according to a light spot obtained at the position where the optical receiving screen is located, and adjusting the relative position between the optical receiving screen and the near-eye display to be measured by means of the transmission mechanism.

Further, as a technical solution, the near-eye display measurement apparatus further includes an imaging measurement unit, and the imaging measurement unit is aligned with the optical receiving screen. The imaging measurement unit acquires a illumination image on the optical receiving screen and measures light distribution information of the image, analyzes the illumination images at different spatial positions by using an image recognition algorithm, and obtains an exit pupil parameter of the near-eye display to be measured by using a tomography method. When the obtained illumination image has the clearest boundary, the area of the image is also the minimum compared with those at other positions, at this time, the plane position where the optical receiving screen is located is the plane where the exit pupil of the near-eye display to be measured is located, and the illumination region obtained by the optical receiving screen is the exit pupil of the near-eye display to be measured. The image recognition algorithm includes an image boundary recognition algorithm and an image center recognition algorithm, the boundary state of the light spot image is analyzed by using the image boundary recognition algorithm, and the center of the illumination image is analyzed by using the image center recognition algorithm. When the image information of the optical receiving screen is acquired by using an imaging measurement unit, it is easier to operate by using a transmissive optical receiving screen. At this time, the imaging measurement unit can be placed behind the optical receiving screen and synchronously moves with the optical receiving screen.

Further, as a technical solution, the near-eye display measurement apparatus further includes an optical tube, and the imaging measurement unit is connected with the optical receiving screen by means of the optical tube. The optical receiving screen is arranged at one end of an optical tube, the imaging measurement unit includes an imaging assembly, and the imaging assembly is arranged in the optical tube and is close to the other end, such that the imaging measurement unit and the optical receiving screen are integrally arranged.

Further, in the above technical solution, the image boundary recognition algorithm includes, but is not limited to, a boundary sharpness recognition algorithm and/or a boundary contrast recognition algorithm. When the image boundary sharpness and/or the contrast reach an extreme value, the clearest boundary is obtained. Further, the algorithm can be used for judging the boundary clarity of the light spot image obtained in each direction and position. Further, in the above technical solution, the image center recognition algorithm includes, but is not limited to, a grayscale gravity center method or a geometric method. The grayscale gravity center method is to calculate the coordinates of a grayscale weight center according to the grayscale distribution of the light spot image obtained by the optical receiving screen. The geometric method is to acquire a graph which is enclosed by the boundary of the illumination image obtained by the optical receiving screen, and to calculate a geometric center of the graph.

Further, in the above technical solution, the optical axis of the imaging measurement unit passes through the center of the optical receiving screen, thereby simplifying the measurement steps, and improving the measurement efficiency.

Further, in the above technical solution, the near-eye display measurement apparatus further includes a displacement assembly for adjusting the distance between the imaging measurement unit and the optical receiving screen, and the imaging measurement unit is connected with the displacement assembly.

Further, in the above technical solution, the relative motion between the optical receiving screen and the near-eye display to be measured includes translation in three directions, that is, upper-lower, left-right and front-rear directions, and rotation along two or more mutually vertical rotating axes, or the relative motion between the optical receiving screen and the near-eye display to be measured includes a multi-degree-of-freedom composite motion.

Further, the transmission mechanism includes a rotating mechanism and/or a translation mechanism.

Further, the transmission mechanism is a robot mechanism having four or more rotating shafts.

Further, the optical receiving screen is made of a thin diffuse transmission film material, which has a high transmittance and a small thickness.

Further, the optical receiving screen is a diffusing screen with good diffuse transmission, and various points in the plane are uniform and isotropic.

The measurement apparatus of the near-eye display has the following beneficial effects: the present invention provides a near-eye display measurement apparatus, the implementation steps of the measurement solution are simple and feasible, thereby greatly simplifying the measurement steps of the optical axis and the eye point of the near-eye display, improving the measurement efficiency, and reducing the measurement cost.

BRIEF DESCRIPTION OF THE DRAWINGS

In FIG. 1 to FIG. 8, 1 denotes a near-eye display to be measured; 2 denotes an object plane of the near-eye display to be measured; 3 denotes an optical axis of the near-eye display to be measured; 4 denotes an exit pupil; 5 denotes an illumination distribution image of light which is received by a large enough plane-array photoelectric sensor and is emitted from an image-space image output by the near-eye display to be measured; 6 denotes the plane-array photoelectric sensor; 7 denotes a sensitive region of the plane-array photoelectric sensor; 8 denotes an image-space picture (an image plane) output by the near-eye display to be measured; 9 denotes an eye box; 10 denotes an eye point; 11 denotes a support frame; 11-1 denotes a support frame for clamping the plane-array photoelectric sensor; 11-2 denotes a support frame for clamping an imaging apparatus; 12 denotes a two-axis rotating platform; 13 denotes the imaging apparatus; 14 denotes a four-axis moving platform; 15 denotes a sample stage; and 16 denotes a three-dimensional translation stage.

DETAILED DESCRIPTION OF THE EMBODIMENTS

Specific embodiments of the present invention are described below in combination with the accompanying drawings, but it should be understood by those skilled in the art that, the following embodiments are merely for illustration and are not intended to limit the scope of the present invention. It should be understood by those skilled in the art that, modifications can be made to the following embodiments without departing from the scope and spirit of the present invention. The protection scope of the present invention is defined by the appended claims.

Embodiment 1

Figure 1:
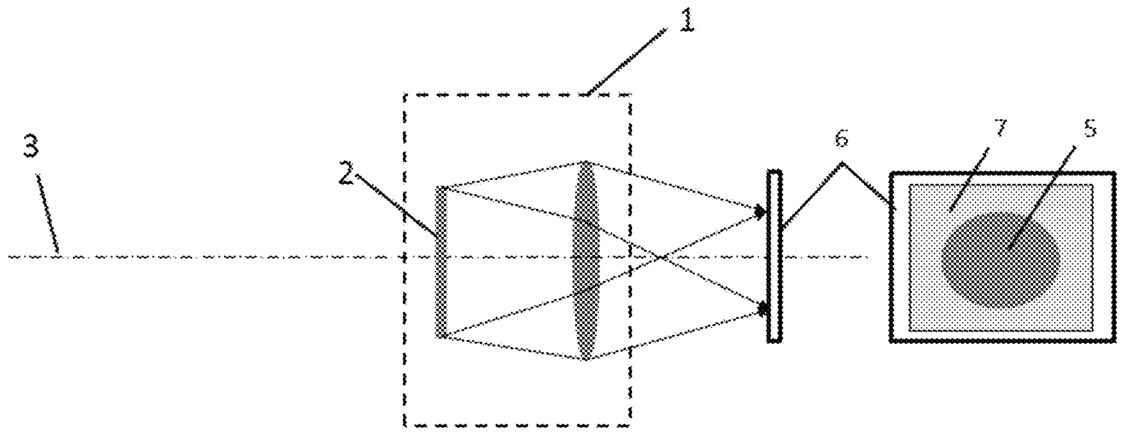
FIG. 1 is a schematic diagram of the principle of a technical solution of the present invention.
Figure 2:
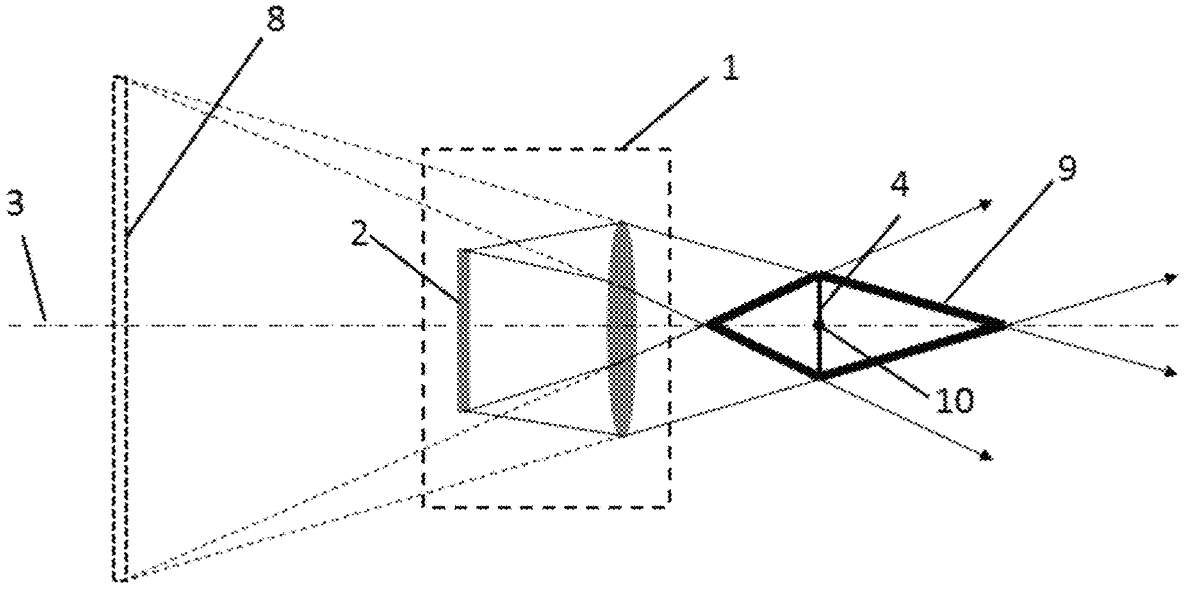
FIG. 2 is a schematic diagram of an exit pupil, an eye point and an optical axis of a near-eye display.
Figure 3:
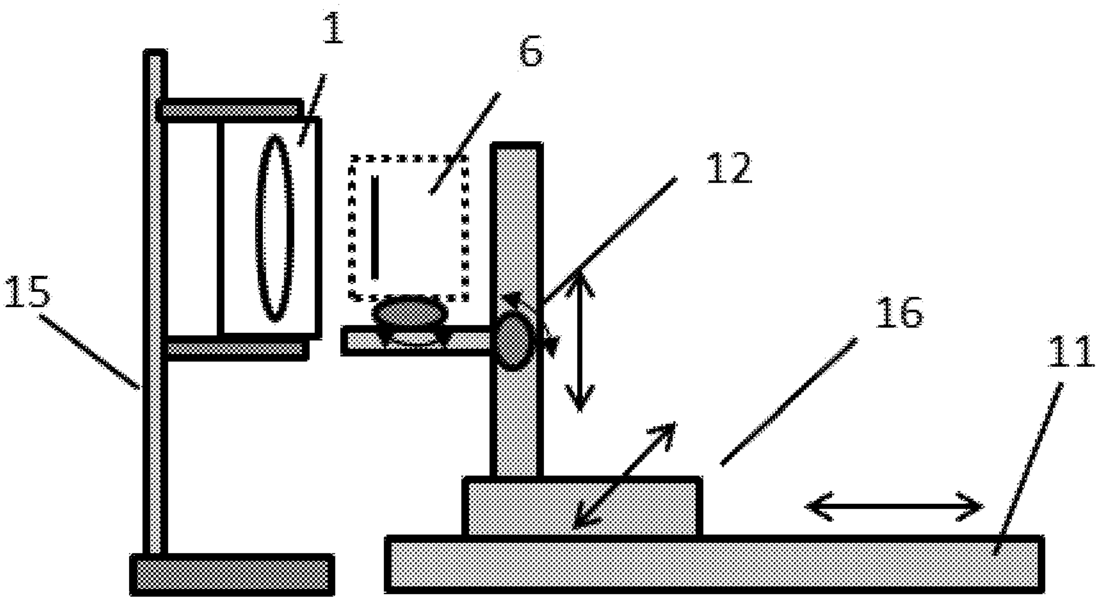
FIG. 3 is a schematic structural diagram of a measurement apparatus of a near-eye display provided in Embodiment 1 of the present invention.

The present embodiment discloses a measurement apparatus of a near-eye display, as shown in FIG. 3, including a near-eye display 1 to be measured, a sample stage 15 for clamping the near-eye display 1 to be measured, an plane-array photoelectric sensor 6, and a support frame 11 for clamping the plane-array photoelectric sensor 6, wherein the support frame 11 includes a three-dimensional translation stage 16 and a two-axis rotating platform 12; the near-eye display 1 to be measured is arranged on the sample stage 15, the three-dimensional translation stage 16 and the two-axis rotating platform 12 respectively control the movement and rotation of the plane-array photoelectric sensor 6, so as to change the positional relationship between the plane-array photoelectric sensor 6 and the near-eye display 1 to be measured, and to measure illumination distributions at different positions; and when the plane-array photoelectric sensor 6 is located at different positions, the illumination distributions received by the plane-array photoelectric sensor 6 are different. An illumination distribution image is analyzed by using a boundary recognition algorithm, so as to obtain an exit pupil parameter of the near-eye display to be measured.

Embodiment 2

Figure 4:
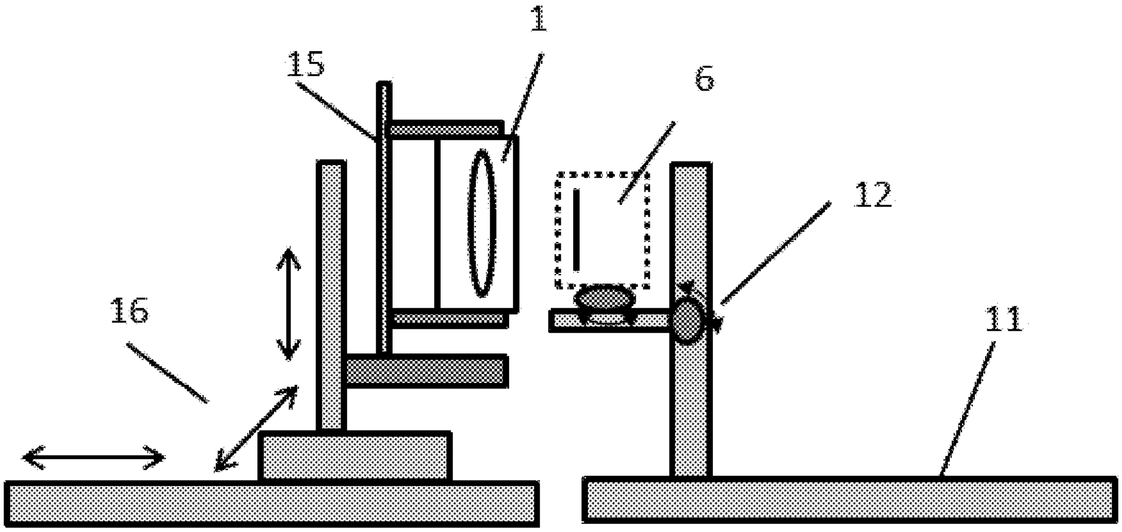
FIG. 4 is a schematic structural diagram of a measurement apparatus of a near-eye display provided in Embodiment 2 of the present invention.

The present embodiment discloses a measurement apparatus of a near-eye display, as shown in FIG. 4, including a near-eye display 1 to be measured, a sample stage 15 for clamping the near-eye display 1 to be measured, an plane-array photoelectric sensor 6, and a support frame (11) for clamping the plane-array photoelectric sensor 6, wherein the sample stage includes a three-dimensional translation stage 16, the support frame 11 includes a two-axis rotating platform 12, the near-eye display 1 to be measured is arranged on the sample stage 15, the three-dimensional translation stage 16 controls the near-eye display to be measured to move, and the two-axis rotating platform 12 controls the plane-array photoelectric sensor 6 to rotate, so as to change the positional relationship between the plane-array photoelectric sensor 6 and the near-eye display 1 to be measured, and to measure illumination distributions at different positions; and an illumination distribution image is analyzed by using a boundary recognition algorithm, so as to obtain an exit pupil parameter of the near-eye display to be measured.

Embodiment 3

Figure 5:
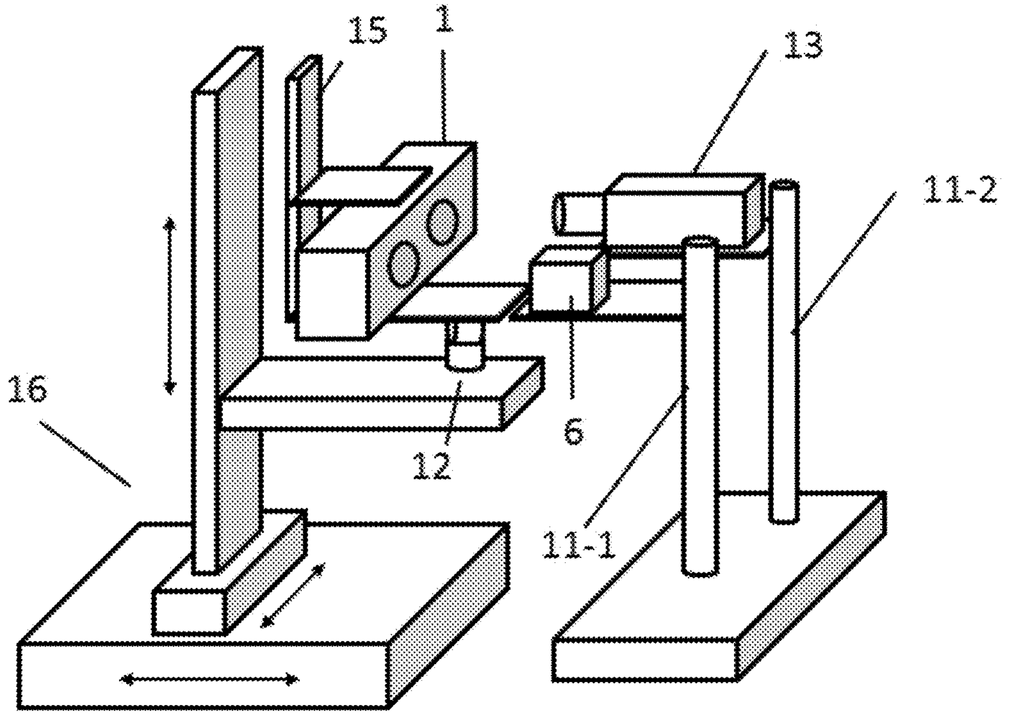
FIG. 5 is a schematic structural diagram of a measurement apparatus of a near-eye display provided in Embodiment 3 of the present invention.

The present embodiment discloses a measurement apparatus of a near-eye display, as shown in FIG. 5, including a near-eye display 1 to be measured, a sample stage 15 for clamping the near-eye display 1 to be measured, an plane-array photoelectric sensor 6, a support frame 11-1 for clamping the plane-array photoelectric sensor 6, an imaging device 13, a support frame 11-2 for clamping the imaging device, a three-dimensional translation stage 16 and a two-axis rotating platform 12, wherein the near-eye display 1 to be measured is arranged on the sample stage 15, the three-dimensional translation stage 16 and the two-axis rotating platform 12 control the near-eye display 1 to be measured to move and rotate, the plane-array photoelectric sensor 6 is arranged on the support frame 11-1 for clamping the plane-array photoelectric sensor 6, and the imaging device 13 is arranged on the support frame 11-2 for clamping the imaging device. The plane-array photoelectric sensor 6 cooperates with the imaging device 13 to obtain an exit pupil parameter and an optical axis position of the near-eye display to be measured.

Embodiment 4

Figure 6:
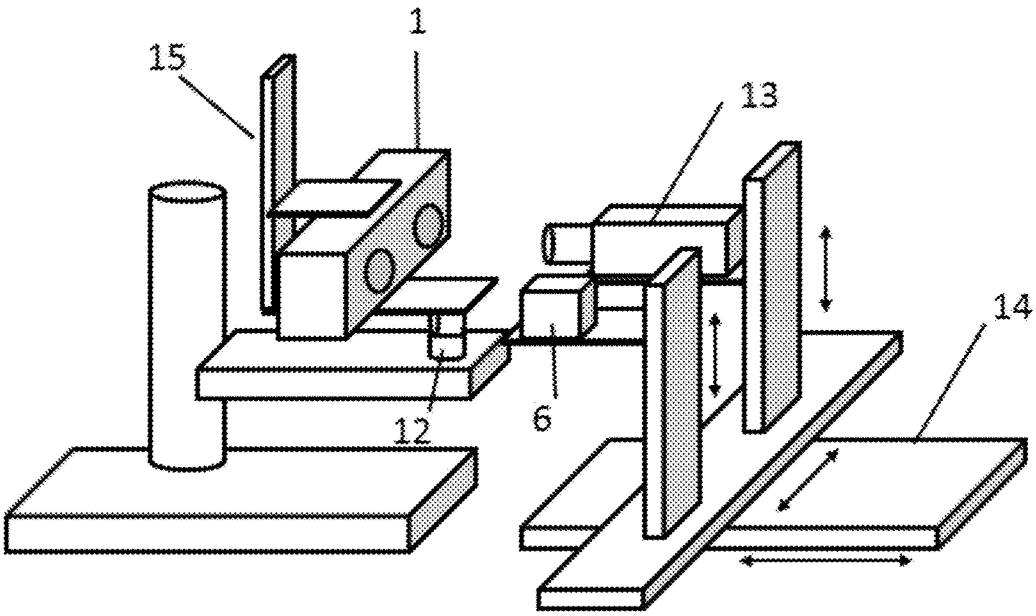
FIG. 6 is a schematic structural diagram of a measurement apparatus of a near-eye display provided in Embodiment 4 of the present invention.

The present embodiment discloses a measurement apparatus of a near-eye display, as shown in FIG. 6, including a near-eye display 1 to be measured, a sample stage 15 for clamping the near-eye display 1 to be measured, an plane-array photoelectric sensor 6, an imaging device 13, a four-axis moving platform 14 and a two-axis rotating platform 12, wherein the near-eye display 1 to be measured is arranged on the sample stage 15, the two-axis rotating platform 12 controls the near-eye display 1 to be measured to rotate, the plane-array photoelectric sensor 6 and the imaging device 13 are respectively arranged on the four-axis moving platform 14, and the four-axis moving platform 14 controls the plane-array photoelectric sensor 6 and the imaging device 13 to move. The plane-array photoelectric sensor 6 cooperates with the imaging device 13 to obtain an exit pupil parameter and an optical axis position of the near-eye display to be measured.

Figure 7:
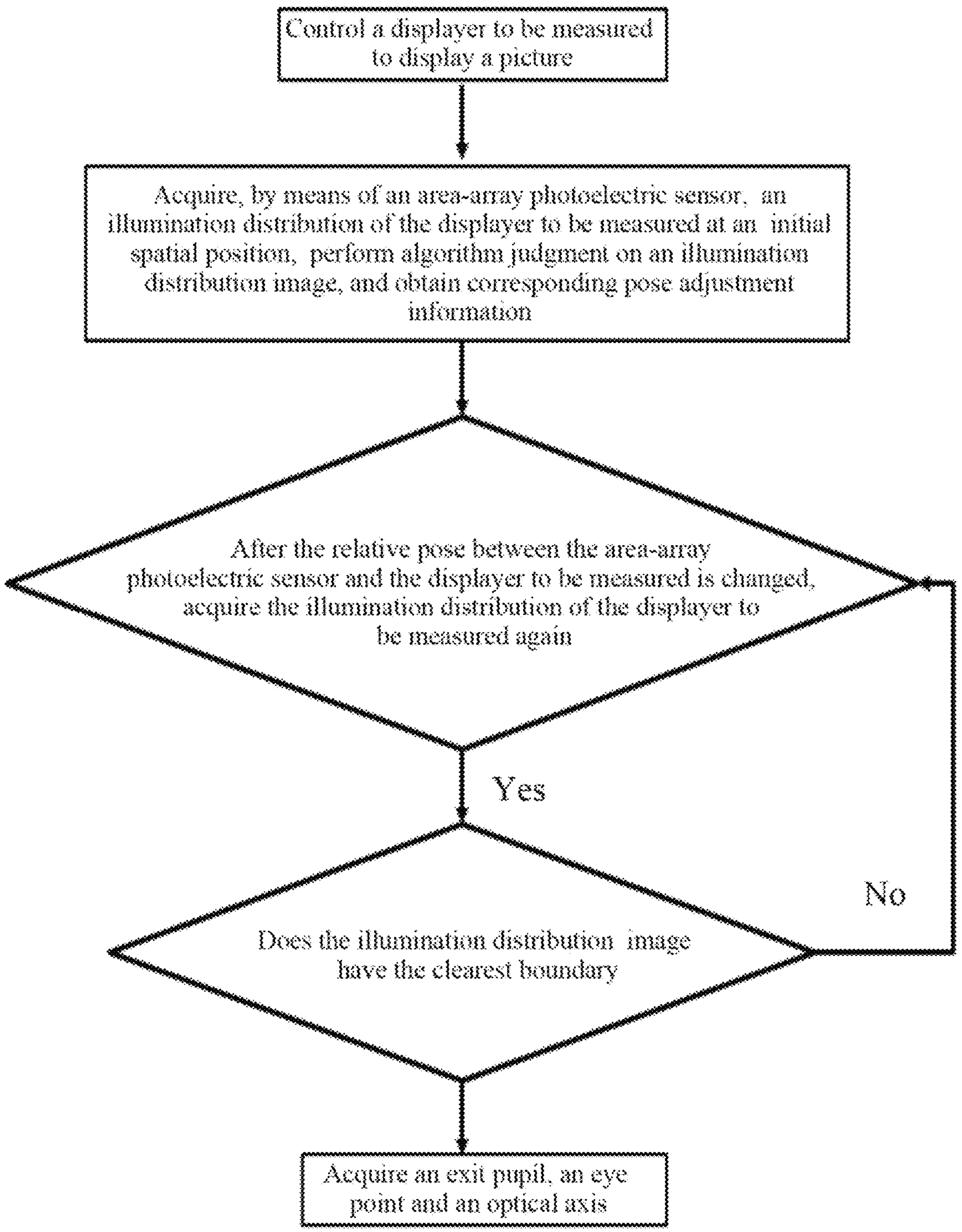
FIG. 7 is a flowchart of a measurement method of a near-eye display provided in the present invention.

The present embodiment further discloses a measurement method of a near-eye display, as shown in FIG. 7, including the following measurement steps:

S1, controlling the near-eye display 1 to be measured to output a picture 2;

S2, acquiring an illumination distribution of the near-eye display to be measured at an initial spatial position by means of the plane-array photoelectric sensor 6, performing algorithm judgement on an illumination distribution image, and obtaining corresponding pose adjustment information;

S3, changing the relative pose between the plane-array photoelectric sensor 6 and the near-eye display 1 to be measured by using the three-dimensional translation stage 16 and the two-axis rotating platform 12, then acquiring the illumination distribution of the near-eye display to be measured again, and performing image algorithm judgement on the illumination distribution image again; and S4, if it is judged that the boundary sharpness of the illumination distribution image does not reach the highest boundary sharpness, obtaining the corresponding pose adjustment information again, and repeating the step S3; and if it is judged that the illumination distribution image meets a threshold value requirement set by the algorithm, a plane where the plane-array photoelectric sensor 6 is located being a plane where an exit pupil of the near-eye display to be measured is located, at this time, a light spot area on the plane-array photoelectric sensor 6 being an exit pupil 4 of the near-eye display to be measured, the center of the exit pupil 4 being an eye point 5, and an axis passing through the center of the exit pupil 4 to be vertical to the exit pupil 4 of the near-eye display 1 to be measured being an optical axis 3 of the near-eye display to be measured.

Figure 8:
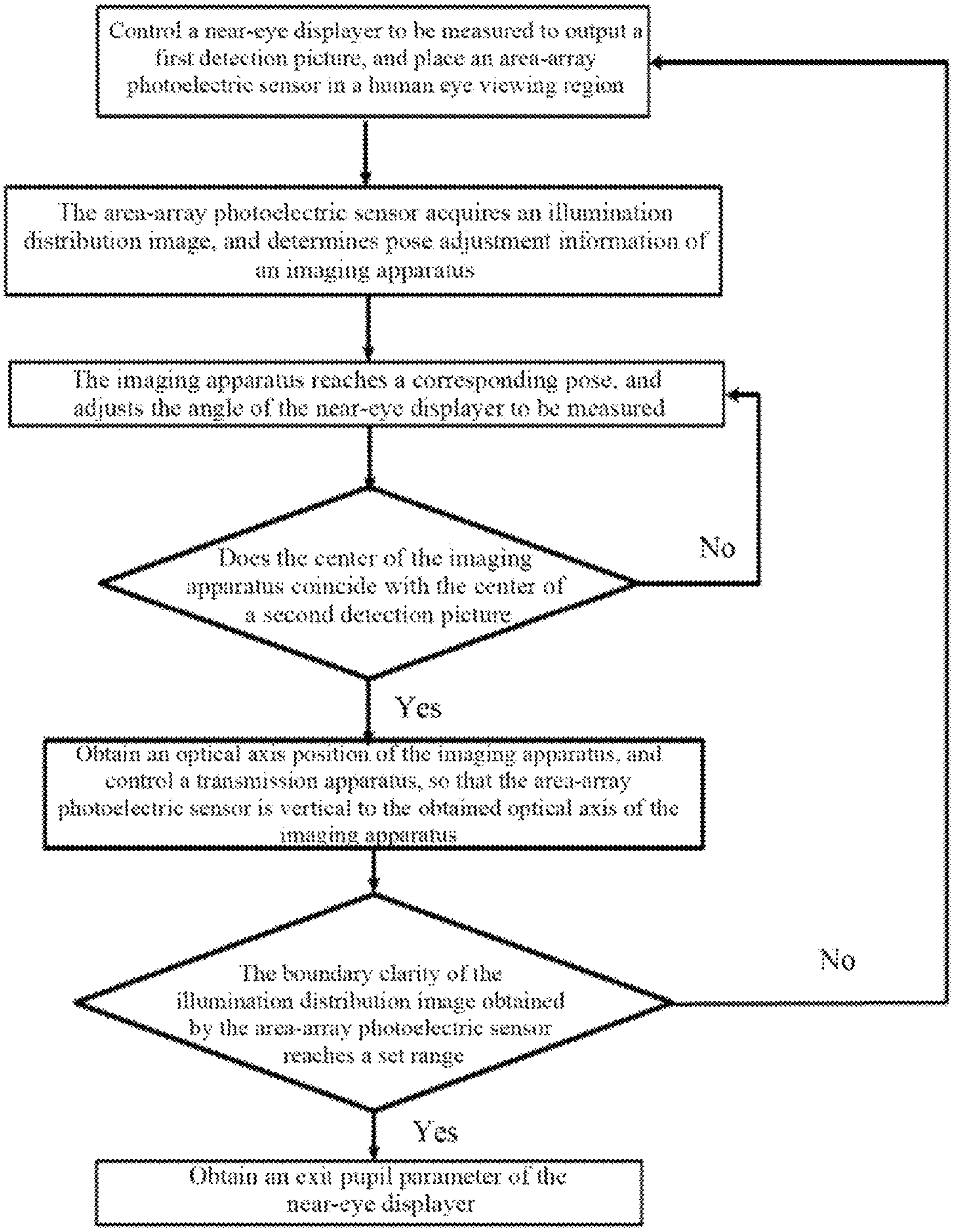
FIG. 8 is a flowchart of another measurement method of a near-eye display provided in the present invention.
Figure 9:
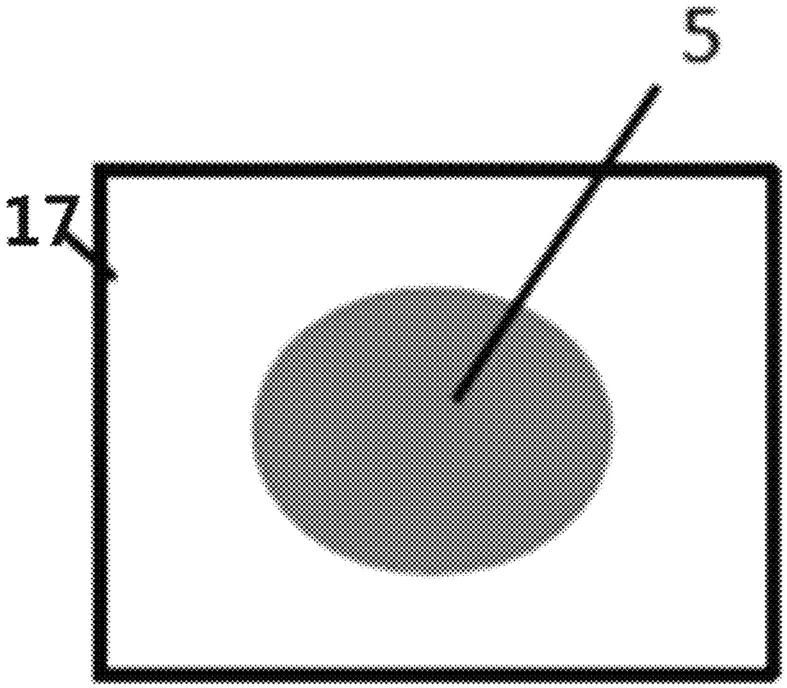
FIG. 9 is a schematic diagram of a light spot formed on an optical receiving screen in the present invention.

The present embodiment further discloses a measurement method of a near-eye display, as shown in FIG. 8, including the following measurement steps:

S1, the near-eye display to be measured outputting a first detection picture; the area array photoelectric sensor 6 being placed in a human eye viewing region of the near-eye display 1 to be measured, and directly receiving an optical output signal from the near-eye display 1 to be measured and obtaining an illumination distribution image;

S2, obtaining a central position of the illumination distribution image by means of an image center recognition algorithm, and determining relative pose adjustment information of the imaging device 13 and the near-eye display 1 to be measured; by means of the four-axis moving platform 14, controlling the imaging device 13 to adjust the pose of the imaging device 13;

S3, the near-eye display to be measured outputting a second detection picture, focusing the imaging device 13 on the second detection picture, controlling, by the two-axis rotating platform 12, the near-eye display 1 to be measured, so that the near-eye display 1 to be measured and the imaging device 13 rotate, in this way, the center of a receiving target surface of the imaging device 13 coincides with the center of the acquired second detection picture, and recording the positions of the imaging device and the optical axis thereof at this time;

S4, controlling the area array photoelectric sensor 6 by means of the four-axis moving platform 14, so that the area array photoelectric sensor 6 is vertical to the optical axis of the imaging device in step S3, and then controlling the area array photoelectric sensor 6 to be adjusted front and back in the optical axis direction, until an illumination distribution image 5 with the relatively clearest boundary is obtained; and repeating steps S1 to S4 until the boundary clarity of the illumination distribution image obtained in step S4 reaches a set range, then the optical axis position being the optical axis position of the near-eye display to be measured, the region where the boundary-clear illumination distribution image obtained by the area array photoelectric sensor is located being the exit pupil of the near-eye display, and the center of the illumination distribution image being an eye point.

Embodiment 5

Figure 10:
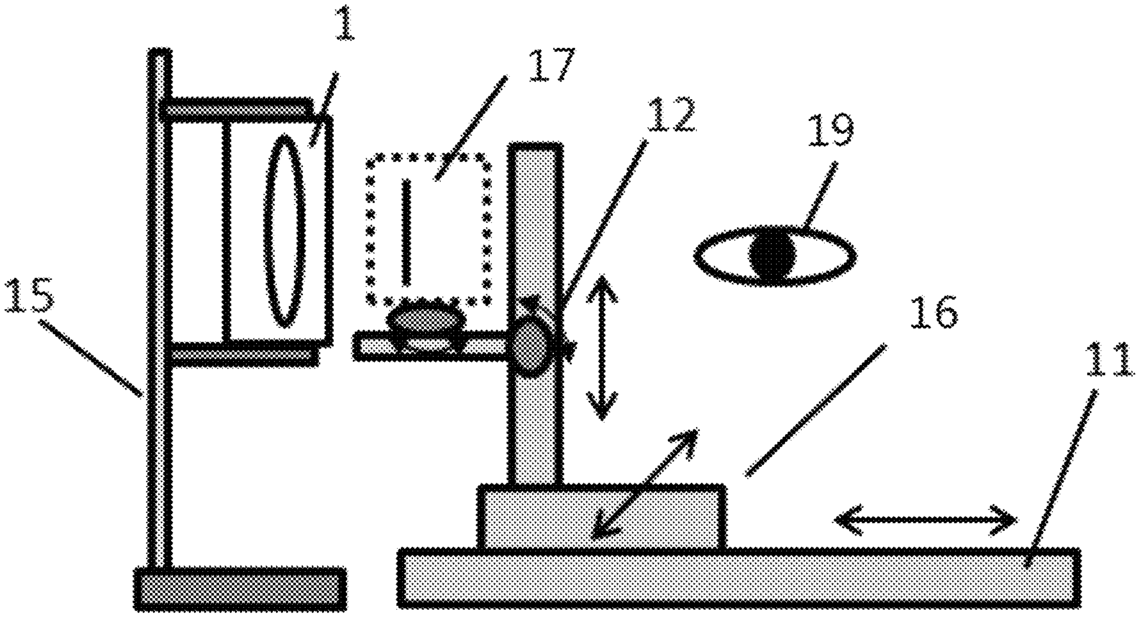
FIG. 10 is a schematic structural diagram of a measurement apparatus of a near-eye display provided in Embodiment 5 of the present invention.

The present embodiment discloses a near-eye display measurement apparatus, as shown in FIG. 10, including a sample stage 15 for clamping a near-eye display 1 to be measured, an optical receiving screen 17, a support frame 11 for clamping the optical receiving screen 17, and a programmed control system (not shown in the figure), wherein the support frame 11 includes a three-dimensional translation stage 16 and a two-axis rotating platform 12, and the three-dimensional translation stage 16 and the two-axis rotating platform 12 are electrically connected with the programmed control system, respectively. A near-eye display 1 to be measured is arranged on the sample stage 15, and the programmed control system controls the three-dimensional translation stage 16 and the two-axis rotating platform 11, so that the optical receiving screen 17 moves and rotates, so as to change the positional relationship between the optical receiving screen 17 and the near-eye display 1 to be measured, and to form light spot images of different sizes on the optical receiving screen 17; and the size of a light receiving surface of the optical receiving screen 17 is greater than the size of an exit pupil of the near-eye display 1 to be measured. When the optical receiving screen 17 is located at different positions, the distribution of the light spot images received by the optical receiving screen 17 is different. Visual observation analysis and judgement are performed on the light spot images, so that an exit pupil parameter of the near-eye display to be measured can be obtained. When the light spot image has the clearest boundary, the area of the image is also the minimum compared with those at other positions, it is judged that the optical receiving screen is located on a plane where the exit pupil of the near-eye display to be measured is located, and the light spot on the optical receiving screen is the exit pupil of the near-eye display to be measured; and the central position of the exit pupil is the eye point of the near-eye display to be measured, and a vertical line of an exit pupil plane is drawn in a manner of passing through the central position of the exit pupil, so as to obtain an optical axis of the near-eye display to be measured.

Embodiment 6

Figure 11:
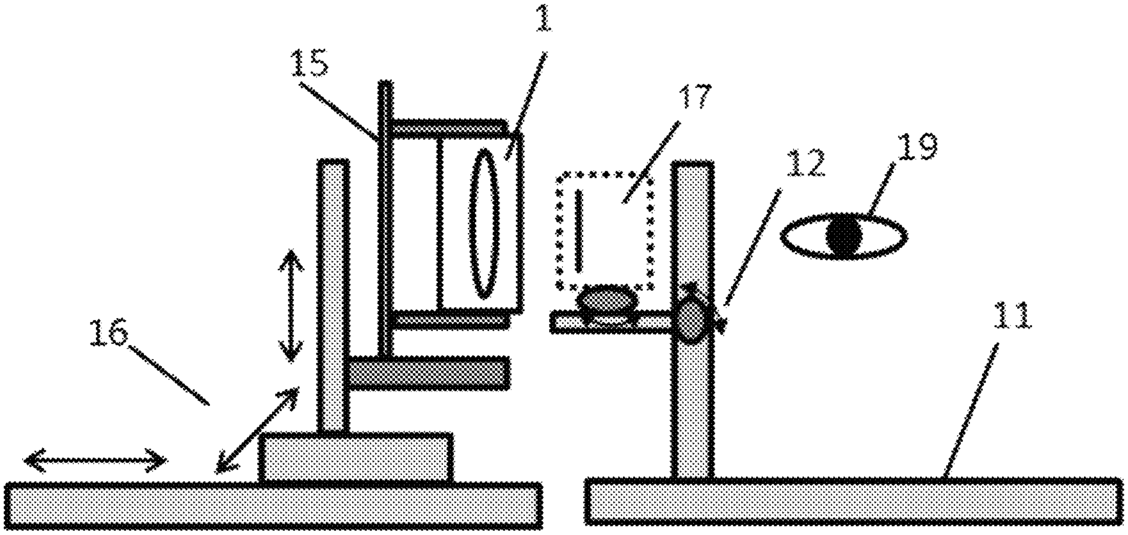
FIG. 11 is a schematic structural diagram of a measurement apparatus of a near-eye display provided in Embodiment 6 of the present invention.

The present embodiment discloses a near-eye display measurement apparatus, as shown in FIG. 11, including a sample stage 15 for clamping a near-eye display 1 to be measured, an optical receiving screen 17, a support frame 11 for clamping the optical receiving screen 17, and a programmed control system (not shown in the figure), wherein the sample stage includes a three-dimensional translation stage 16, the support frame 11 includes a two-axis rotating platform 12, and the three-dimensional translation stage 16 and the two-axis rotating platform 12 are electrically connected with the programmed control system, respectively. A near-eye display 1 to be measured is arranged on the sample stage 15, under the control of the programmed control system, the three-dimensional translation stage 16 causes the near-eye display 1 to be measured to move, and under the control of the programmed control system, the two-axis rotating platform 12 causes the optical receiving screen 17 to rotate, so as to change the positional relationship between the optical receiving screen 17 and the near-eye display 1 to be measured, and to form light spot images of different sizes on the optical receiving screen 17; and the size of a light receiving surface of the optical receiving screen 17 is greater than the size of an exit pupil of the near-eye display 1 to be measured. When the optical receiving screen 17 is located at different positions, the distribution of the light spot images received by the optical receiving screen 17 is different. Visual observation analysis and judgement are performed on the light spot images, so that an exit pupil parameter of the near-eye display to be measured can be obtained. When the light spot image has the clearest boundary, the area of the image is also the minimum compared with those at other positions, it is judged that the optical receiving screen is located on a plane where the exit pupil of the near-eye display to be measured is located, and the light spot on the optical receiving screen is the exit pupil of the near-eye display to be measured; and the central position of the exit pupil is an eye point of the near-eye display to be measured, and a vertical line of an exit pupil plane is drawn in a manner of passing through the central position of the exit pupil, so as to obtain an optical axis of the near-eye display to be measured.

Embodiment 7

Figure 12:
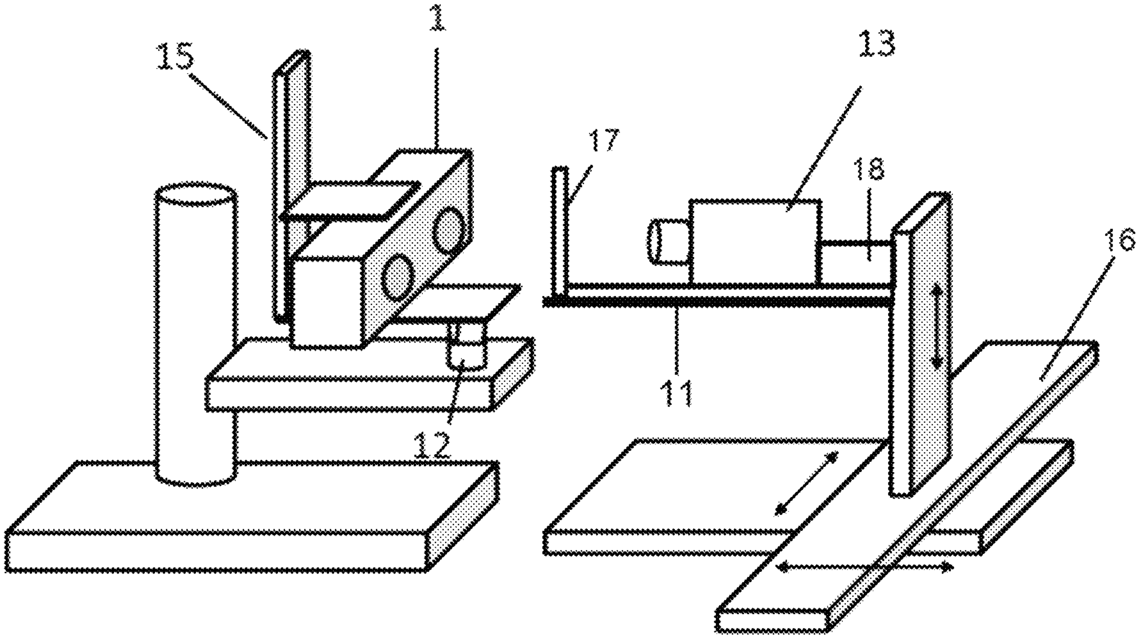
FIG. 12 is a schematic structural diagram of a measurement apparatus of a near-eye display provided in Embodiment 7 of the present invention.

The present embodiment discloses a near-eye display measurement apparatus, as shown in FIG. 12, including a sample stage 15 for clamping a near-eye display 1 to be measured, an optical receiving screen 17, an imaging apparatus 13, a support frame 11 for clamping the optical receiving screen 17 and the imaging apparatus 13, and a programmed control system (not shown in the figure), wherein the sample stage 15 includes a two-axis rotating platform 12, the support frame 11 includes a three-dimensional translation stage 16 and a displacement assembly 18 for adjusting the distance between the optical receiving screen 17 and the imaging apparatus 13, and the two-axis rotating platform 12, the three-dimensional translation stage 16 and the displacement assembly 18 are electrically connected with the programmed control system, respectively. A near-eye display 1 to be measured is arranged on the sample stage 15, the programmed control system controls the three-dimensional translation stage 16 and the two-axis rotating platform 12, so that the near-eye display 1 to be measured and the optical receiving screen 17 generate relative motion and rotation, and the programmed control system controls the displacement assembly 18 to change the distance between the optical receiving screen 17 and the imaging apparatus 13; and the size of a light receiving surface of the optical receiving screen 17 is greater than the size of an exit pupil of the near-eye display 1 to be measured. The optical receiving screen 17 cooperates with the imaging apparatus 13, so as to obtain an exit pupil parameter and an optical axis position of the near-eye display to be measured.

What is claimed is:

1. A measurement method of a near-eye display, wherein a plane-array photoelectric sensor having no imaging lens and a transmission mechanism are used to obtain an exit pupil parameter of a near-eye display to be measured; the method comprises:

displaying a picture by the near-eye display to be measured, the plane-array photoelectric sensor being placed in a human eye viewing region of the near-eye display to be measured, directly receiving by the plane-array photoelectric sensor an optical output signal from the near-eye display to be measured and obtaining an illumination image; controlling by the transmission mechanism a relative displacement of the plane-array photoelectric sensor and the near-eye display to be measured, and analyzing the illumination images obtained at different spatial positions so as to obtain an exit pupil parameter of the near-eye display to be measured.

2. The measurement method of the near-eye display according to claim 1, wherein the analyzing the illumination images comprises: judging a boundary of the illumination image by using an image boundary recognition algorithm, when the illumination image has a clear boundary, the plane-array photoelectric sensor being located on a plane where an exit pupil of the near-eye display to be measured is located, and the illumination region being the exit pupil of the near-eye display to be measured; and by using an image center recognition algorithm, obtaining a center of the illumination image, and obtaining a central position of the exit pupil, so as to obtain an eye point of the near-eye display to be measured.

3. The measurement method of the near-eye display according to claim 2, wherein after the central position of the exit pupil is obtained by using the image center recognition algorithm, a vertical line of the exit pupil of the near-eye display to be measured is drawn in a manner of passing through the central position of the exit pupil, so as to obtain an optical axis of the near-eye display to be measured.

4. The measurement method of the near-eye display according to claim 2, wherein a size of a photosensitive surface of the plane-array photoelectric sensor is greater than a size of the exit pupil of the near-eye display to be measured, and when it is judged by using the image boundary recognition algorithm that an illumination distribution image has the clear boundary, the exit pupil of the near-eye display to be measured is directly obtained.

5. The measurement method of the near-eye display according to claim 2, wherein a size of the photosensitive surface of the plane-array photoelectric sensor is less than a size of the exit pupil of the near-eye display to be measured, when it is judged by using the image boundary recognition algorithm that an illumination distribution image has the clear boundary, the plane-array photoelectric sensor and the near-eye display to be measured are controlled by the transmission mechanism to generate relative translation, and the exit pupil of the near-eye display to be measured is obtained by splicing.

6. The measurement method of the near-eye display according to claim 2, wherein the image boundary recognition algorithm comprises at least one of a boundary sharpness recognition algorithm and a boundary contrast recognition algorithm; and the image center recognition algorithm is configured to execute one of a grayscale gravity center method and a geometric method.

7. The measurement method of the near-eye display according to claim 1, wherein the analyzing the illumination images comprises: judging a boundary of the illumination image by using an image boundary recognition algorithm, calculating an area of the illumination image, wherein when the area of the illumination image is a relative minimum area compared with areas of light spot images received at other positions, the plane-array photoelectric sensor being located on a plane where an exit pupil of the near-eye display to be measured is located, and an illumination region being the exit pupil of the near-eye display to be measured; and by utilizing an image center recognition algorithm, obtaining the center of the illumination image, and obtaining a central position of the exit pupil, so as to obtain an eye point of the near-eye display to be measured.

8. The measurement method of the near-eye display according to claim 1, wherein the picture output by the near-eye display to be measured comprises one of a full-white picture and a black-bottom and white-frame picture.

9. The measurement method of the near-eye display according to claim 1, wherein controlling the transmission mechanism comprises: obtaining corresponding pose adjustment information by means of processing and analyzing the illumination image obtained at an instant position where the plane-array photoelectric sensor is located, and adjusting a relative position between the plane-array photoelectric sensor and the near-eye display to be measured by means of the transmission mechanism.

10. The measurement method of the near-eye display according to claim 1, wherein a relative motion between the plane-array photoelectric sensor and the near-eye display to be measured comprises translation in three directions, that is, upper-lower, left-right and front-rear directions, and rotation along two or more mutually vertical rotating shafts, or a multi-degree-of-freedom composite motion.

* * * * *